(12) United States Patent  
Kemist

(10) Patent No.: US 8,763,261 B1
(45) Date of Patent: Jul. 1, 2014

(54) APPARATUS FOR MEASURING THE INTERNAL FIT OF FOOTWEAR

(76) Inventor: Adam Kemist, Los Altos, CA (US)

(*) Notice: Subject to any disclaimer, the term of this patent is extended or adjusted under 35 U.S.C. 154(b) by 158 days.

(21) Appl. No.: 13/348,472

(22) Filed: Jan. 11, 2012

Related U.S. Application Data

(60) Provisional application No. 61/432,170, filed on Jan. 12, 2011.

(51) Int. Cl.
*A43D 1/02* (2006.01)
(52) U.S. Cl.
USPC .................................. 33/3 R; 33/6
(58) Field of Classification Search
USPC ............................... 33/3 R, 6, 515
See application file for complete search history.

(56) References Cited

U.S. PATENT DOCUMENTS

| | | | |
|---|---|---|---|
| 1,725,334 A | 8/1929 | Brannock | |
| 4,876,758 A * | 10/1989 | Rolloff et al. | 33/551 |
| 5,339,252 A | 8/1994 | White et al. | |
| 5,640,779 A * | 6/1997 | Rolloff et al. | 33/514.2 |
| 5,689,446 A * | 11/1997 | Sundman et al. | 33/3 R |
| 5,879,725 A | 3/1999 | Potter | |
| 6,160,264 A * | 12/2000 | Rebiere | 33/515 |
| 6,163,971 A | 12/2000 | Humphries et al. | |
| 6,192,593 B1 * | 2/2001 | Borchers et al. | 33/3 A |
| 6,550,149 B2 | 4/2003 | Dowdell | |
| 6,741,728 B1 | 5/2004 | Genest | |
| 6,834,437 B1 * | 12/2004 | Kilgore et al. | 33/515 |
| 6,904,692 B2 * | 6/2005 | Tadin | 33/515 |
| 6,983,548 B1 | 1/2006 | Cook et al. | |
| 7,114,260 B2 | 10/2006 | Nguyen et al. | |
| 7,343,691 B2 * | 3/2008 | Long et al. | 33/555.4 |
| 7,346,998 B2 * | 3/2008 | Tadin et al. | 33/515 |
| 7,516,560 B2 * | 4/2009 | Long | 33/555.4 |
| 7,949,570 B2 | 5/2011 | Litke et al. | |
| 8,117,922 B2 | 2/2012 | Xia et al. | |
| 2004/0168329 A1 | 9/2004 | Ishimaru | |
| 2005/0049816 A1 | 3/2005 | Oda et al. | |
| 2008/0028625 A1 * | 2/2008 | Nudelman et al. | 33/515 |
| 2010/0293076 A1 | 11/2010 | End et al. | |
| 2013/0192071 A1 * | 8/2013 | Esposito et al. | 33/6 |

OTHER PUBLICATIONS

Office Action mailed Nov. 6, 2013 for U.S. Appl. No. 13/348,571.
Office Action mailed Oct. 23, 2012 for U.S. Appl. No. 13/348,598.

* cited by examiner

*Primary Examiner* — Yaritza Guadalupe-McCall
(74) *Attorney, Agent, or Firm* — Lowenstein Sandler LLP

(57) ABSTRACT

A footwear measuring apparatus includes a body, a plurality of probes, one or more measurement devices and at least one calibration sensor. The plurality of probes are configured to extend from the body. The measurement devices are configured to measure distances that the plurality of probes extend from the body, wherein the distances indicate fit parameters of footwear. The at least one calibration sensor is configured to determine if the footwear measuring apparatus is properly positioned inside of the footwear for measuring.

17 Claims, 8 Drawing Sheets

(SIDE PROFILE 100)

(SIDE PROFILE 100)

(TOP PROFILE 200)

(BACK PROFILE 300)

(FRONT PROFILE 400)

APPARATUS FOR MEASURING THE INTERNAL FIT OF FOOTWEAR

RELATED APPLICATIONS

This patent application claims the benefit under 35 U.S.C. §119(e) of U.S. Provisional Application No. 61/432,170, filed Jan. 12, 2011, which is herein incorporated by reference. This patent application is additionally related to co-pending U.S. patent application Ser. No. 13/348,571, filed Jan. 11, 2012 and U.S. patent application Ser. No. 13/348,598, filed Jan. 11, 2012.

BACKGROUND OF THE INVENTION

The number one reason people buy a shoe is for the fit. Unfortunately, there is not a uniform standard for the fit of shoes. This means that a men's US 9.0 is not the same distance from heel to toe across manufactures. The shape of the shoe, commonly called the last, can also vary from manufacturer to manufacturer. Additionally, a single manufacturer may use more than one shape, which causes a difference in fit between shoes within the same manufacturer.

It is presently difficult for a consumer to determine how one shoe will fit compared to another without trying on the shoes. Accordingly, when shoes are sold on the internet or through a catalog, consumers frequently return shoes after trying them on at home due to a poor fit. This has created a high return rate for online retailers.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

Described herein is a footwear measuring apparatus for measuring fit parameters of footwear. Also described herein is a method for measuring internal fit parameters of footwear using a footwear measuring apparatus. In one embodiment, a footwear measuring apparatus has a body and multiple probes mounted to the body. The probes may be configured to extend from the body until they meet a specified level of resistance. The footwear measuring apparatus further includes one or more measurement devices (e.g., sensors such as potentiometers) that measure distances that the probes extend from the body. These distances indicate fit parameters (e.g., internal dimensions) of footwear. The footwear measuring apparatus may additionally include a calibration sensor, mounted to the body, to determine if the footwear measuring apparatus is properly positioned inside of the footwear for measuring.

Footwear measuring apparatuses described in embodiments of the present invention can be used to measure internal fit parameters of footwear, where the internal fit parameters may correspond to particular internal dimensions of the footwear. Examples of such particular internal dimensions include an internal length, an internal width at one or more regions, and an internal height at one or more regions. These fit parameters can be stored in a footwear database and used to determine footwear that will fit particular individuals. Footwear measuring apparatuses described in embodiments of the present invention can be used by online retailers of footwear to significantly reduce returns for online footwear purchases.

Figure 1:
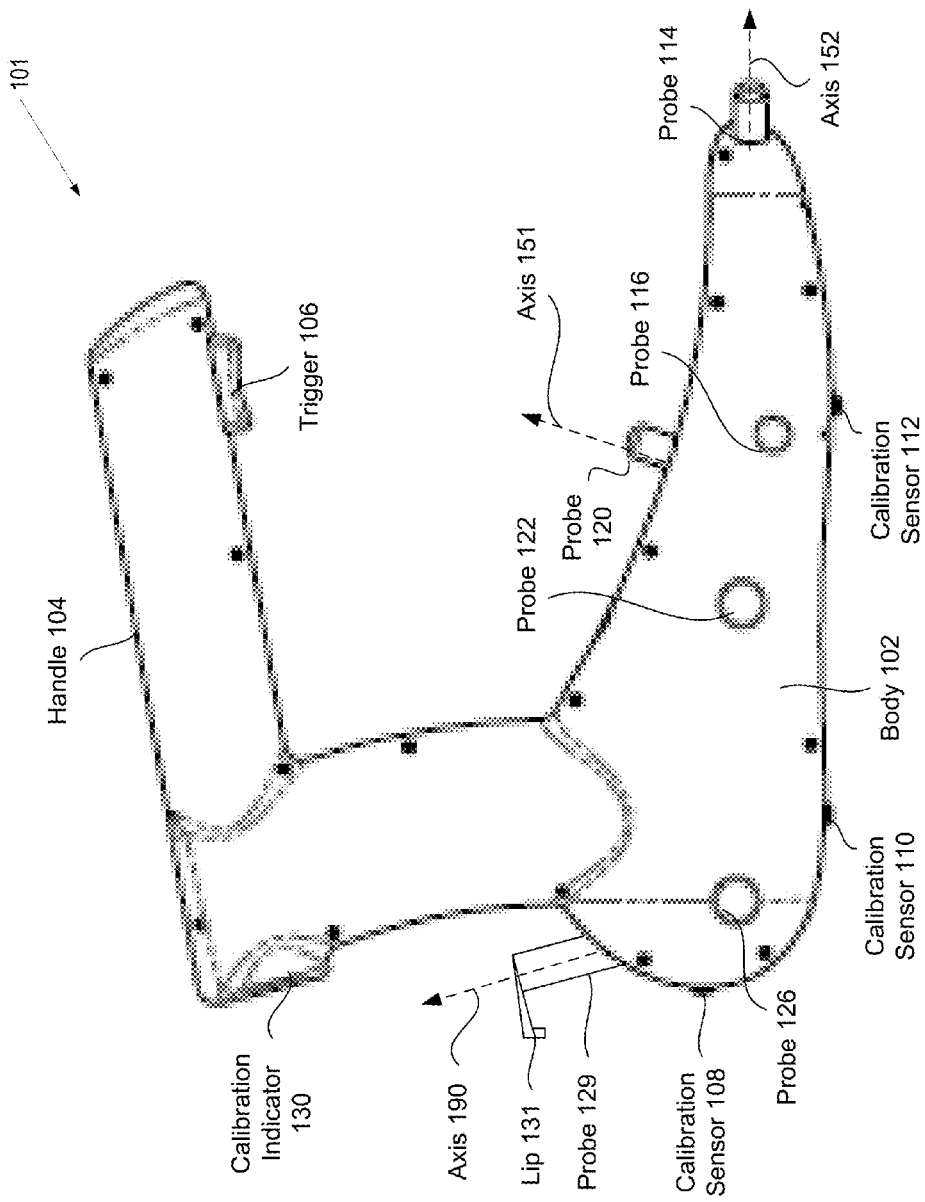
FIG. 1 shows a side profile of a footwear measuring apparatus, in accordance with one embodiment of the present invention.
Figure 2:
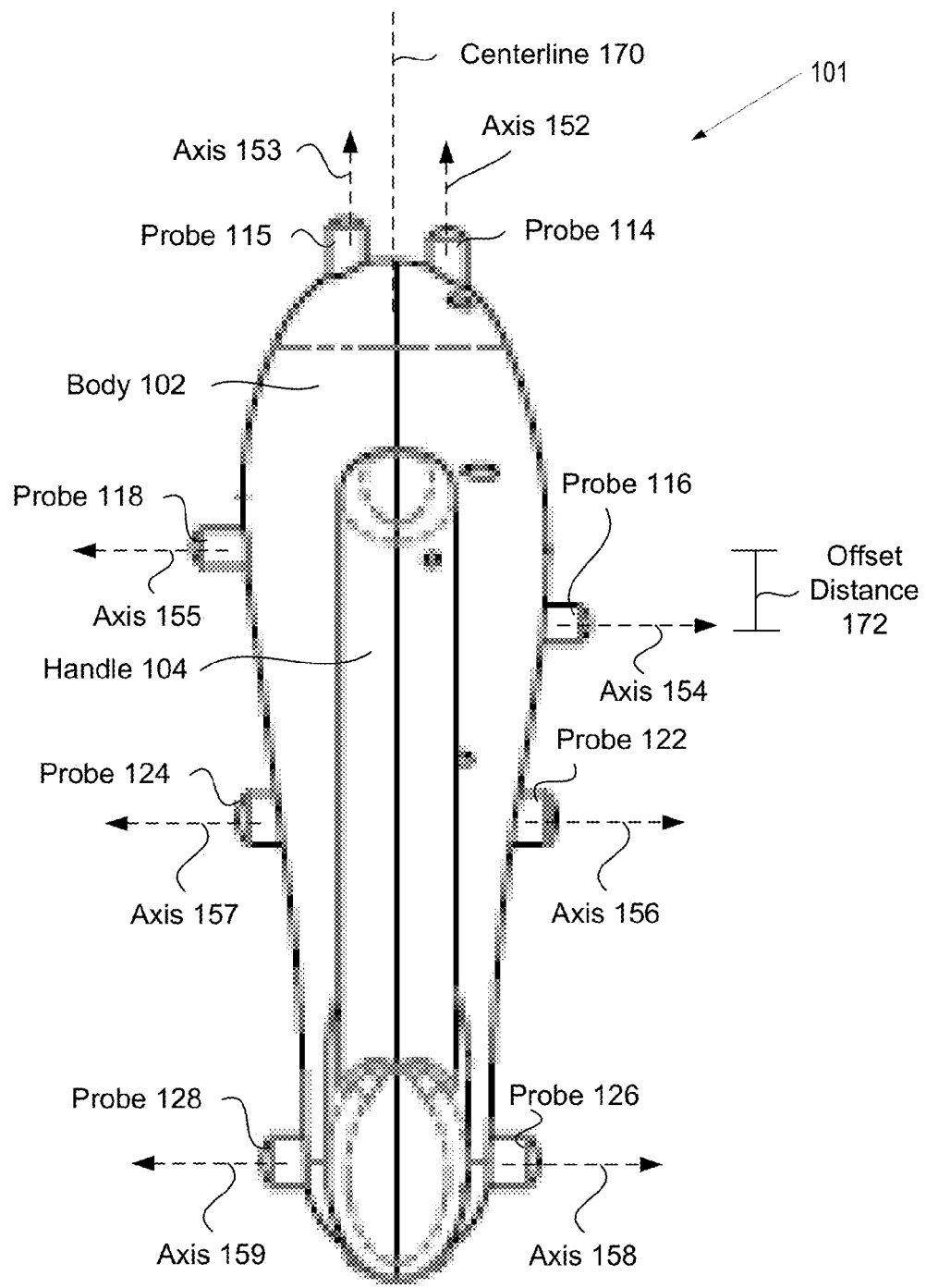
FIG. 2 shows a top profile of a footwear measuring apparatus, in accordance with one embodiment of the present invention.
Figure 3:
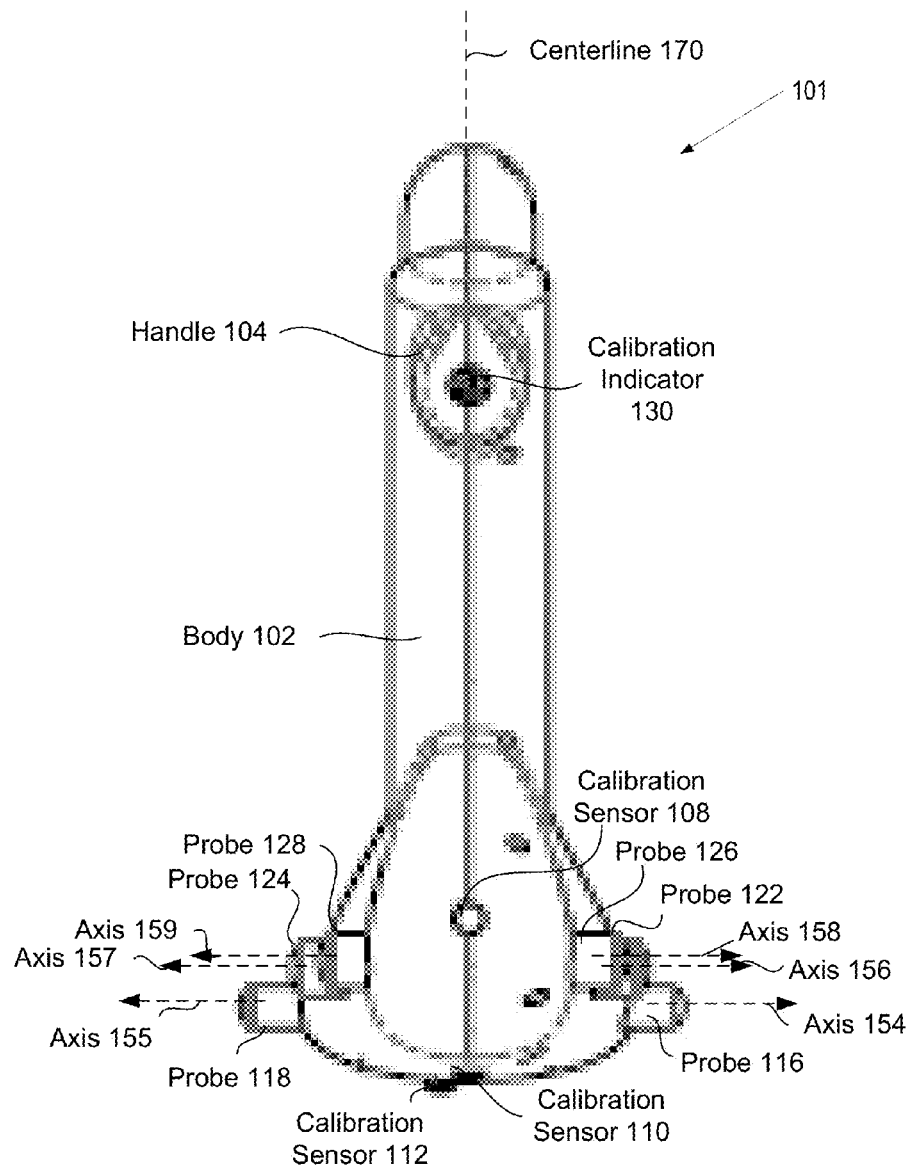
FIG. 3 shows a back profile of a footwear measuring apparatus, in accordance with one embodiment of the present invention.
Figure 4:
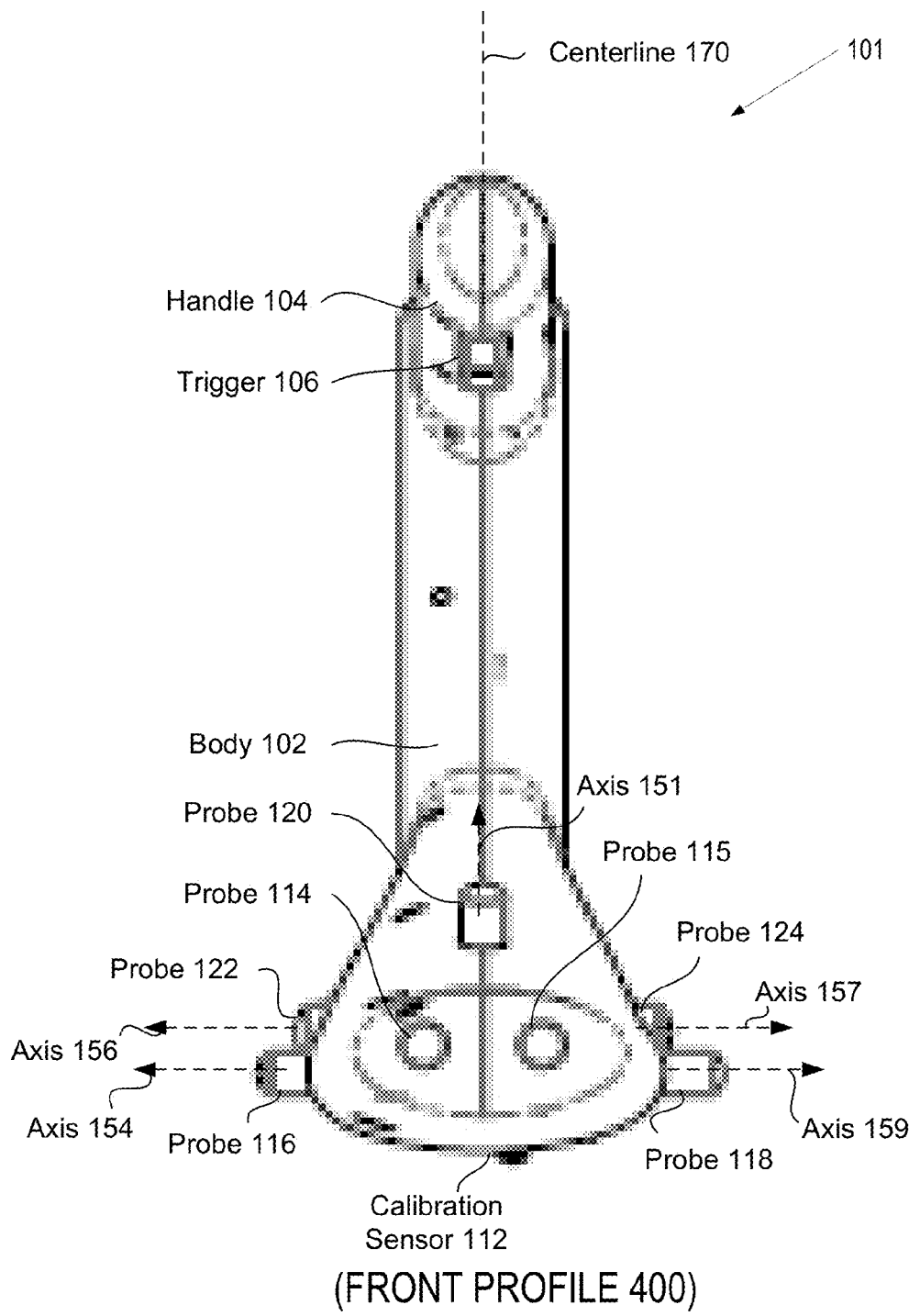
FIG. 4 shows a front profile of a footwear measuring apparatus, in accordance with one embodiment of the present invention.
Figure 5:
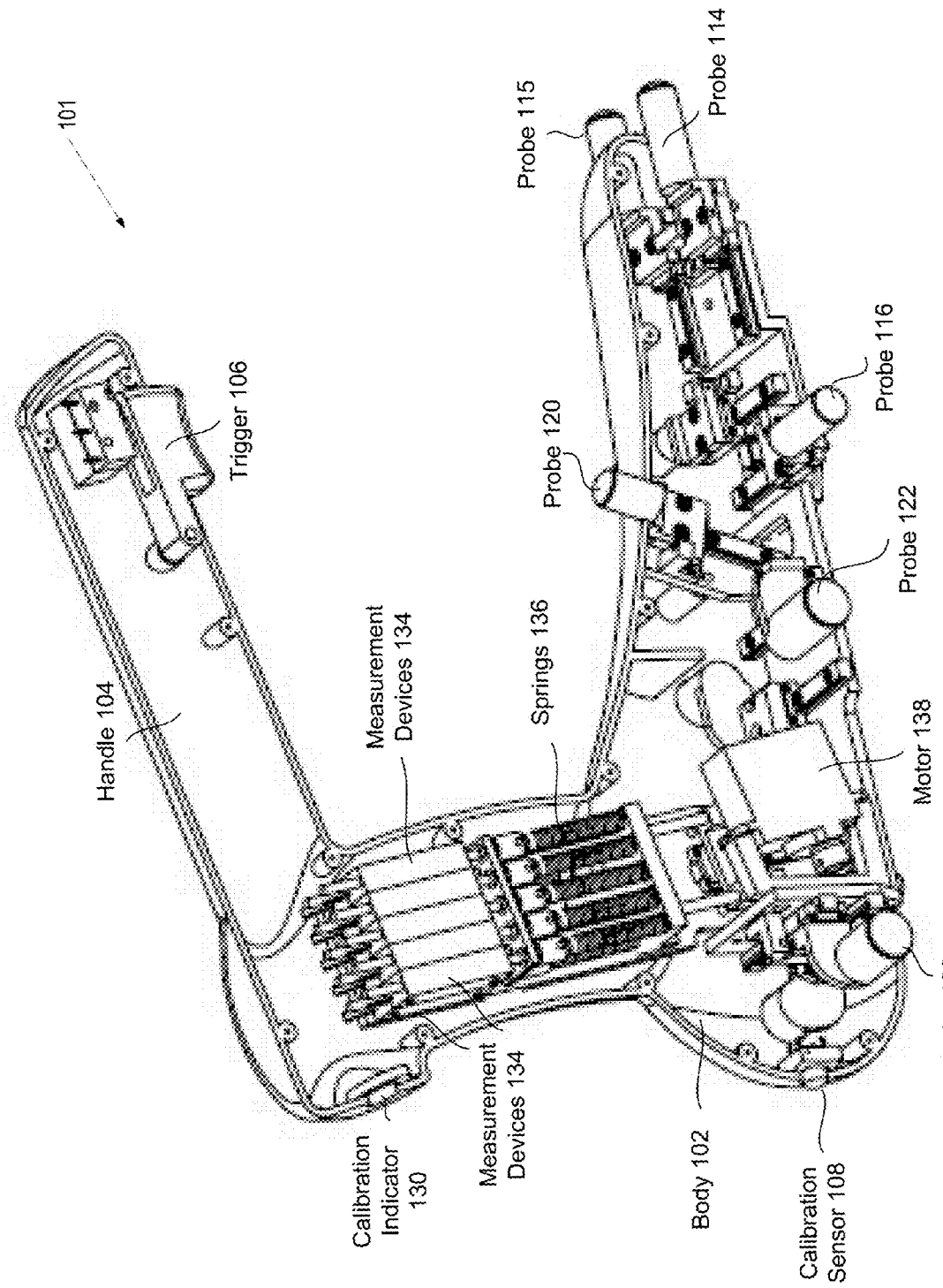
FIG. 5 shows a cross sectional side profile of a measuring device, in accordance with one embodiment of the present invention.

FIGS. 1-5 illustrate multiple different profiles of a footwear measuring apparatus 101, in accordance with embodiments of the present invention. The footwear measuring apparatus 101 can quantify the internal dimensions of footwear such as a shoe, boot, slipper, etc. by accurately measuring internal points as they relate to the foot. Using multiple sensors and/or probes built into a standardized mold, these internal fit points can be measured. The information from each of the sensors and/or probes can be used to determine actual dimensions inside footwear. Sensors and/or probes in the footwear measuring apparatus may additionally measure a heel-to-toe drop (difference in midsole height between heel and forefoot), pronation, and/or other parameters. Collectively, the internal footwear dimensions, heel-to-toe drop, pronation, and so on are referred to herein as fit parameters. FIG. 1 shows a side profile 100 of the footwear measuring apparatus 101, in accordance with one embodiment of the present invention. FIG. 2 shows a top profile 200 of the footwear measuring apparatus 101, in accordance with one embodiment of the present invention. FIG. 3 shows a back profile 300 of the footwear measuring apparatus 101, in accordance with one embodiment of the present invention. FIG. 4 shows a front profile 400 of the footwear measuring apparatus 101, in accordance with one embodiment of the present invention. FIG. 5 shows a cross sectional side profile of a measuring device, in accordance with one embodiment of the present invention.

The footwear measuring apparatus 100 includes a body 102 that may be shaped approximately like a human foot. Alternatively, the body 102 may not be shaped like a foot. For example, the body 102 may rectangular or oval in shape. The body 102 may be composed of plastic, steel, aluminum, carbon fiber, graphite, wood, rubber, other materials, or a combination thereof.

The body 102 may include a handle 104 that may be held by a user. Alternatively, the handle 104 may be a separate component that is coupled to the body 102. The handle 104 may be mounted perpendicular to the body 102 rising off a base of the body 102 (e.g., by 5", 7", or some other distance), then bending approximately 90 degrees toward the front of the apparatus 101 and extending over the midfoot and/or forefoot regions of the body (e.g., by 4", 5", 7", etc.). Handle 104 may be made of a same material as the body 102 (e.g., plastic, aluminum, steel, graphite, etc.), or may be made of a different material. The user may grip the handle 104 while the user inserts the shoe measuring apparatus 101 into a shoe or other footwear. The body 102 may be shaped such that the user can continue to grip the handle 104 while the footwear measuring apparatus 101 is inserted inside of footwear. Thus, it may be easy for a user to insert the footwear measuring apparatus 101 into footwear, take a measurement, and then retract the footwear measuring apparatus from the footwear, without releasing or changing a hold on the handle 104.

In one embodiment, the footwear measuring apparatus 101 includes a trigger 106 mounted to the handle 104. Trigger 106 may be a toggle switch or momentary switch, for example. The user may depress the trigger 106 when the footwear measuring apparatus 101 is inserted into footwear. This may cause multiple measurements to be made of the internal dimensions of the footwear. Alternatively, the footwear measuring apparatus 101 may not include a trigger. Instead, the footwear measuring apparatus 101 may be configured to automatically take measurements when the footwear measuring apparatus 101 detects that it has been inserted into footwear.

In one embodiment, measurement is initiated by instructing a computer to take the measurements of all of the sensors. The footwear measuring apparatus 101 may be connected to a computer via a universal serial bus (USB), firewire, WiFi, Bluetooth, or other wired or wireless connection. Pressing the trigger can cause a command to be sent to the computer, in response to which the computer may record data from measurement devices 135. In one embodiment, a user can alternatively initiate measurement from the computer without using the trigger 106 (e.g., by pressing a key on a keyboard of the computer). Each measurement may be stored by the computer (e.g., in a storage device) and/or may be stored by the footwear measuring apparatus 101.

Mounted to, and protruding from, the body 102 of the footwear measuring apparatus 101 are multiple probes 114-128. Each probe 114-128 may be positioned on the body 102 to measure a particular region of footwear. The particular regions measured by the probes may correspond to key anatomical points of a human foot. Based on measurements at these regions, an accurate profile of the internal shape of footwear may be determined. This profile may be represented as a collection of internal fit parameters that can be used to determine whether and how well a particular shoe will fit a particular person.

Probes 114 and 115 are located at a toe box or forefront region of the footwear measuring apparatus 101. Probe 115 may be positioned on the body 102 between a centerline 170 and an outside left edge of the body 102 at a location approximately corresponding to a big toe of a human foot. Probe 115 is configured to measure the overall internal length of the footwear. The footwear measuring apparatus may be calibrated to an overall length of the body 102. Thus, footwear measuring apparatus 101 may add the length of the body 102 to a distance that probe 115 is extended from the body 102 to determine the internal length.

Probe 114 may be positioned on a forefoot region of the body 102 between the centerline 170 and a right edge of the body 102 to determine a secondary internal length. Measurements based on probe 114 may be compared to measurements based on probe 115 to determine a shape and/or size of footwear's toe box.

Probe 118 is located at a left edge of the body 102, and may be oriented approximately orthogonal to the centerline 170. Probe 118 is used to measure a region of footwear corresponding to the medial ball-of-the-foot as it relates to the first metatarsal joint. Probe 116, located at a right edge of the body 102, is configured to measure a region of footwear corresponding to the lateral ball-of-the-foot as it relates to the fifth metatarsal joint. Together, probes 116 and 118 may be used to measure an internal width of the footwear at a ball-of-foot region. Note that in one embodiment, probe 118 is offset from probe 116 by an offset distance 172. The human foot is constructed such that the inside ball-of-foot is located further towards the foot's forefront than the outside of the ball-of-foot. Accordingly, offsetting probes 116 and 118 may increase an accuracy of the measured internal width of the ball-of-foot region.

On top of the body 102 is a probe 120 that measures the height of the shoe at the ball of the foot. Measurements based on probes 116, 118 and 120 may be used to determine the relative internal volume at the ball-of-foot region of footwear and/or an internal girth of the footwear at the ball-of-foot region.

In one embodiment, an additional probe may be mounted to the body 102 at a midfoot region at a top of the body 102 to measure the internal height at a midfoot region that relates to the instep of the human foot. On the right side of, and oriented to extend approximately orthogonal to the centerline 170 of, the body 102 is probe 122. Probe 122 may be used to measure the lateral midfoot of the footwear, which may relate to the proximal head of the $5^{th}$ metatarsal bone in the human foot. On the left side of the body 102 at the midfoot region is probe 124. Probe 124 is configured to provide a measurement of the medial midfoot of the footwear, which relates to the medial arch of the human foot. Probes 122 and 124 may be used together to calculate the internal width of the footwear at a midfoot region. Additionally, probe 122 may be used independently to give a better fit of the fifth ray of a human foot. In one embodiment, the mentioned additional probe and/or probe 120 may be used along with probes 122 and 124 to determine a volume and/or girth of the footwear at the midfoot region (e.g., at an instep).

Probe 128, located in the back of the body 102 at a heel region, is on the left side of the body 102. Probe 126 is located on the right side of the body opposite probe 128. Probes 126 and 128 may be used to measure the internal width of the heel portion of footwear as it relates to the heel of a human foot.

In one embodiment, another probe 129 (shown only in FIG. 1) is mounted to a top of the body 102 at a heel region. Probe 129 may include a lip 131 that is designed to catch on a collar of footwear and extend as footwear measuring apparatus 101 is inserted into the footwear. Thus, probe 129 may be used to measure a collar height of footwear (e.g., a distance from the internal base of the footwear to the top of the collar).

Note that other probe configurations than those described may also be used. In other probe configurations, different numbers of probes may be used, and probes may be mounted at different regions and/or with different orientations.

Each probe 114-128 may move linearly along a particular axis. For example, probe 120 may move along axis 151, probe 114 may move along axis 152, probe 115 may move along axis 153, probe 116 may move long axis 154, probe 118 may move along axis 155, probe 122 may move along axis 156, probe 124 may move along axis 157, probe 126 may move along axis 158, probe 128 may move along axis 159 and probe 129 may move along axis 190. The probes 114-128 may extend outward from the body 102 until the probes encounter an internal wall of footwear. In one embodiment, probes extend outward from the body 102 until the probes encounter a particular amount of force. In a further embodiment, probes may extend from the body 102 approximately together (e.g., uniformly or at the same time) with approximately equal amounts of force or pressure. Accordingly, the footwear measuring apparatus 101 may expand footwear that has no rigid form (e.g., footwear made of non-rigid cloth) to the shape that the footwear would have if a human foot were inserted into it. Thus, in embodiments of the present invention, footwear measuring apparatus 101 may be used to measure internal fit parameters of shoes regardless of that shoe's resting shape or state.

Referring to FIG. 5, the footwear measuring apparatus 101 has one or more measurement devices 134 that are configured to measure the distance that the probes 114-129 have extended away from the body 102. In one embodiment, footwear measuring apparatus 101 includes a separate measurement device 134 for each of the probes 114-129. Alternatively, a measurement device 134 may measure displacement of two or more probes 114-128. In one embodiment, measurement devices 134 are potentiometers. Probes 114-128 may be connected to cables (not shown to avoid obscuring other components) that connect the probes to a motor 138 (e.g., a stepper motor, servo motor or other motor type) and to measurement devices 134. The motor 138 may cause the probes to move along their axes via the cables. Each probe may extend from the body 102 until it reaches an internal wall of footwear.

Measurement devices 134 may be sensors such as a spring loaded electrical resistance type sensor (e.g., a potentiometer), a spring loaded infrared light reading sensor, a spring loaded laser reading sensor, and so on. Using a small spring, a shaft may be pushed out of one end of the body of a sensor. The end position of the shaft can be determined by measuring the electrical resistance coming from a small electrical resistor in the body of the sensor. By assigning distance values to electrical resistance values, the sensor can be used to determine distances. In one embodiment, all of the sensors have shafts with the same travel (e.g., a 1½" travel). The amount of travel determines how far of an extension from the body 102 the sensor can measure. Alternatively, different sensors may have shafts with different amounts of travel. For example, some sensors may have a shaft with a 1½" travel, while other sensors may have a shaft with a 2½" travel. In some embodiments, multiple types of sensors are used. For example, some may be spring loaded electrical resistance type sensors, while other sensors may be infrared light reading sensors.

In one embodiment, footwear measuring apparatus 101 further includes an accelerometer (not shown) that measures an orientation of footwear measuring apparatus 101. If the footwear that is to be measured is placed on a level surface, then the accelerometer can determine an angle of the footwear measuring apparatus 101 with regards to gravity and thereby identify a heel-to-toe drop.

In one embodiment, probes 114-128 are extended from body 102 via forces exerted by springs 136. The springs 136 may assert approximately the same force to the probes 114-128. Thus, probes 114-128 may have a fully extended resting state. In one embodiment, the motor 138 is configured to overcome the force exerted on the probes by the springs to retract the probes into the body 102. When the footwear measuring apparatus 101 is to measure footwear, motor 138 may release the probes, and springs 136 may force the probes to extend until they encounter an inner wall of the footwear. The lengths that each probe has extended to reach an inner wall of the footwear may then be recorded (e.g., as resistance values). In one embodiment, this process occurs when a user presses trigger 106 when the measurements of the probes 114-128 displacements have been measured, motor 138 may retract the probes 114-128 back into body 102.

In one embodiment, footwear measuring apparatus 101 includes one or more calibration sensors 108, 110, 112 mounted to body 102. The calibration sensors 108-112 may identify if the shoe measuring apparatus 101 is properly placed inside of footwear for measurement. In one embodiment, each of these calibration sensors 108-112 is a calibration switch such as an on/off type pressure switch.

In one embodiment, footwear measuring apparatus 101 includes a calibration sensor 108 located at a back of body 102 at a heel region. Calibration sensor 108 may determine whether the footwear measuring apparatus 101 is pressed against a back of footwear (e.g. is properly positioned at a back of a shoe). This may ensure that an accurate internal length measurement is taken. In one embodiment, footwear measuring apparatus 101 includes calibration sensor 110 and/or calibration sensor 112 mounted on a bottom of body 102. Calibration sensors 110 and 112 may determine when shoe measuring apparatus 101 is fully planted on a sole of footwear (e.g., whether footwear measuring apparatus 101 is all the way down into the rear portion of the footwear and/or is placed flat in a midfoot or forefront of the footwear measuring apparatus 101). This will insure that the height in the ball of the foot is accurate. This will also insure that the height at the instep is accurate. When all of calibration sensors 108-112 indicate that footwear measuring apparatus 101 is properly positioned, footwear measuring apparatus 101 may be ready to make a measurement.

Note that in one embodiment, calibration sensors 108-112 are on/off switches that protrude from body 102. Calibration sensor 108 may protrude further from the body 102 than calibration sensors 110 and 112. This may minimize a difficulty of causing calibration sensor 108 to activate. Note also that calibration sensor 108 may have a protective covering.

Footwear measuring apparatus 101 may include a calibration indicator 130 that indicates that the footwear measuring apparatus is properly positioned inside of footwear. In one embodiment, calibration indicator 130 is a light (e.g., a light emitting diode (LED)) that lights up when footwear measuring apparatus is properly positioned inside of footwear. For example, calibration indicator 130 may glow green when footwear measuring apparatus is properly positioned, and may glow red (or not glow) when footwear measuring apparatus 101 is improperly positioned. The calibration indicator 130 may be located at a rear of the handle 104 (as shown), or elsewhere on the footwear measuring apparatus. In one embodiment, trigger 106 does not initiate a footwear measurement unless calibration sensors 108-112 indicate that footwear measuring apparatus 101 is properly positioned. In another embodiment, footwear measuring apparatus 101 automatically initiates a footwear measurement when calibration sensors 108-112 indicate that footwear measuring apparatus 101 is properly positioned. Note that the calibration indicator 130 may provide an audible feedback and/or a tactile feedback rather than or in addition to a visual feedback. For example, calibration indicator 130 may include speakers and/or a haptic feedback device.

In one embodiment, footwear measuring apparatus 101 is configured to measure a right foot or a left foot shoe (or other footwear) having a specific size. Footwear measuring apparatus 101 may be configured to measure footwear having a specific size range (e.g., US M 9.0 to US M 10.0). Different footwear measuring apparatuses could be configured for measuring different shoe size ranges. For example, there may be a size 3 footwear measuring apparatus, a size 9 footwear measuring apparatus, a size 15 footwear measuring apparatus, and so on.

In one embodiment, footwear measuring apparatus 101 includes a data interface device (not shown). The data interface device may include an analog to digital converter that converts analog signals (e.g., voltage measurements, resistance measurements, current measurements, etc.) from measurement devices 134 into digital signals. Data interface device 160 may convert the analog signals into digital values that are associated with particular length, area and/or volume measurements. Accordingly, data interface device 160 may transform voltage, resistance and/or current measurements into measurements of length, area and/or volume.

Data interface device 160 may include a processor, which may be programmed with information on an account of time (referred to herein as an extension time) that it takes to fully extend the probes 114-128 from a retracted position to an extended position. The processor may monitor an amount of time that has passed since a measurement was initiated and then record the output values of measurement devices 135 when the extension time has been reached. Measurements may be taken in a second or fraction of a second. The entire process of inserting the footwear measuring apparatus 101 into footwear, taking measurements and removing the apparatus 101 from the footwear may be performed in under 15 seconds.

In one embodiment, data interface device generates signals that can be transmitted over a digital communication protocol such as universal serial bus (USB), Bluetooth®, WiFi®, Zigbee®, etc. In one embodiment, data interface device includes a USB port, a firewire port, a Thunderbolt port, or other digital wired interface port. Footwear measurement apparatus 101 may be connected to a computing device via the wired interface port. Data interface device may also contain a wireless communication mechanism (e.g., a wireless modem) for communicating with a computing device via WiFi, Bluetooth, Zigbee, etc. In one embodiment, data interface device includes a wireless modem that connects with a wireless telephone network.

A protective covering (not shown) can be used to cover the entire apparatus 101. This protective covering may be semi-permanently attached to the apparatus 101 along the bottom of the apparatus 101. By attaching to the bottom, it may keep the protective covering from moving excessively around the apparatus. The protective covering may have elastic properties similar to human skin. It may offer the flexibility that the body panels need to move within the shoe. It may offer the sheer protection to a shell of the body 102. It may offer barrier protection from dirt and debris. This barrier protection may keep the internal electronics safe.

Note that embodiments of the present invention have been described with a cable system that is used to extend and retract probes 114-128. However, it should be understood that in alternative embodiments, other mechanisms may be used to extend and retract the probes 114-128. For example, a pneumatic system may be used and/or a magnetic system may be used.

Note also that embodiments of the present invention have been described with reference to probes that physically extend from the body 102 and measuring devices 135 that measure the extension of these probes. However, in alternative embodiments, no physical probes may be used. Instead, sensors may be positioned at the locations where probes are illustrated in FIGS. 1-5. For example, range finders such as laser range finders may be positioned at the locations shown to contain probes. These range finders may each measure one of the aforementioned dimensions.

Using the supplied handle 104, the apparatus 101 is inserted into a shoe toe first. While a user holds handle 104, the device may be placed into the center and bottom of the shoe to be tested. When the apparatus 101 is properly located all the way back in the heel of the footwear, plus all the way down in the heel and/or the forefoot of the footwear, then calibration indicator 130 may be illuminated. When the calibration indicator 130 is illuminated, the trigger 106 may be depressed to initiate measurement. Upon depression, the distance measurements based on displacement of probes 114-128 may be read and stored into a local memory on apparatus 101 or into a remote data store (e.g., into a database). The measurements may be stored in locations (e.g., directories and/or fields) that correspond to fit parameters of the footwear being tested. In one embodiment, the shoe measurement information is added to different attributes or fields of a database. The database may include a separate attribute/field for each of the fit parameters. A database schema may define the different attributes/fields, and may indicate some sensor measurements that are required and some sensor measurements that are optional.

Figure 6:
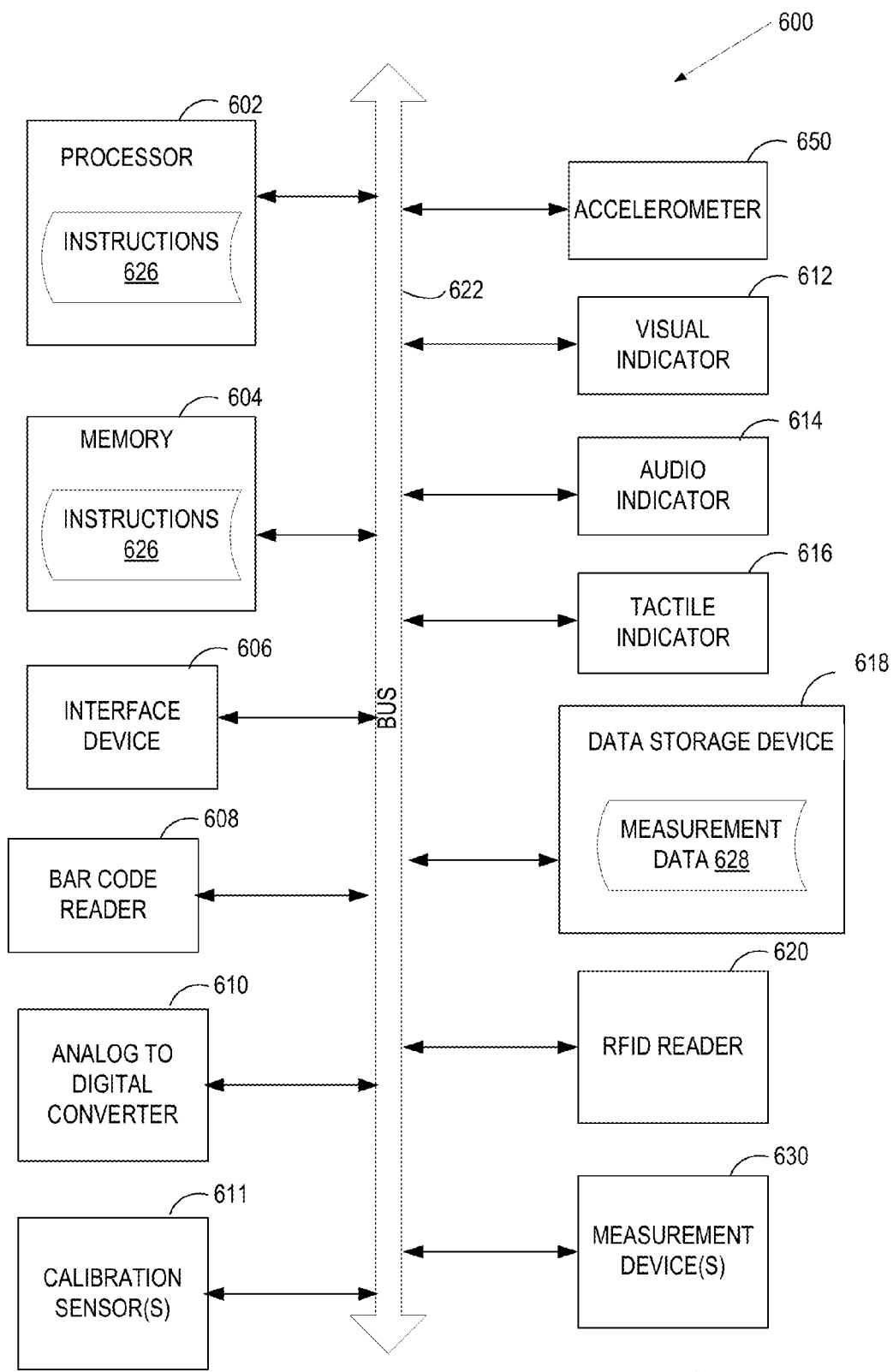
FIG. 6 is a block diagram of a footwear measuring apparatus, in accordance with one embodiment of the present invention.

FIG. 6 is a block diagram of the electronic components and/or computing components of a footwear measuring apparatus 600, in accordance with one embodiment of the present invention. In one embodiment, footwear measuring apparatus 600 corresponds to footwear measuring apparatus 101 illustrated in FIGS. 1-5.

Footwear measuring apparatus 600 includes one or more measurement devices 630 that measure fit parameters (e.g., internal dimensions) of footwear. The measurement devices 630 may be, for example, potentiometers that measure a voltage shift caused by displacement of one or more probes (not shown) that are included in the footwear measuring apparatus 600. The measurement devices 630 may output an analog or digital signal associated with a particular measurement. Examples of output signals may include voltages, resistances, currents, and so forth.

If measurement devices 630 output analog signals, footwear measuring apparatus 600 may include an analog to digital converter (ADC) 610 coupled to the measurement devices directly or via a bus 622. The ADC 610 may convert input analog signals into a discrete digital representation (into digital signals).

In one embodiment, footwear measuring apparatus 600 includes an accelerometer 650 connected to bus 622. The accelerometer 650 may determine an orientation of the footwear measuring apparatus 101 and output the orientation to processor 102.

A processor 602 may be coupled to the measurement device (or devices) 630 and/or the ADC 610 directly or via bus 622. Processor 602 may represent one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, a programmable logic controller (PLC), or the like. The processor 602 may be configured to execute instructions 626 for performing operations described herein.

In one embodiment, processor 602 is configured by the instructions 626 to convert received measurements that are in units of voltage, resistance, current, etc. into measurements that are units of length, area, volume, etc. Instructions 626 may include information identifying length measurements that correspond to, for example, resistance measurements taken by each of the measurement devices 630. Instructions 626 may also cause processor 602 to generate fit parameters for additional unmeasured footwear sizes based on fit parameters of a measured footwear size. One embodiment for a system and method of generating fit parameters for unmeasured footwear sizes is described in co-pending U.S. patent application Ser. No. 13/348,571, entitled "System And Method For Determining Internal Fit of Footwear," filed Jan. 11, 2012, which is herein incorporated by reference.

Footwear measuring apparatus 600 may further include a memory 604, which may be coupled to processor 602 and/or to bus 622. Memory 604 may store instructions 626 that are accessible to processor 602. Memory 604 may be, for example, a read-only memory (ROM), flash memory, dynamic random access memory (DRAM) such as synchronous DRAM (SDRAM) or Rambus DRAM (RDRAM), etc.), static random access memory (SRAM), etc.

Footwear measuring apparatus 600 may include one or more calibration sensors 611 that are configured to detect when the footwear measuring device 600 is ready to generate measurements. The calibration sensors 611 may be, for example, momentary on/off switches. Calibration sensors 611 may be configured to complete an electric circuit when they are on, enabling a footwear measurement to be made. Alternatively, calibration sensors 611 may send a signal to processor 602 via bus 622 notifying processor 602 that the footwear measuring apparatus 600 is properly positioned for measuring. Processor 602 may then enable a measurement and/or automatically initiate a measurement.

Footwear measuring apparatus 600 may include a visual indicator 612, an audio indicator 614 and/or a tactile indicator 616 connected to bus 622. Audio indicator 614 may be a speaker. Visual indicator may be a light emitting diode (LED), a liquid crystal display (LCD), an organic light emitting diode (OLED) display, an incandescent light, or other type of light or display. Tactile indicator 616 may be a haptic device that vibrates to provide feedback, such as a rumblepack. The visual indicator 612, audio indicator 614 and/or tactile indicator 616 may provide feedback to a user of the footwear measuring apparatus 600 when calibration sensors 611 indicate that footwear measuring apparatus 600 is ready to generate a measurement (e.g., that it is properly positioned inside a shoe).

Footwear measuring apparatus 600 may include a data storage device 618 configured to store measurement data 628. Data storage device 618 may be a secure digital (SD) card, a hard disk drive, a solid state drive, or other type of non-volatile storage. In one embodiment, data storage device 618 and memory 604 are combined into a single unit.

In one embodiment, footwear measuring apparatus 600 includes a bar code reader 608 and/or a radio frequency identifier (RFID) reader 620. These readers may be used to obtain a universal product code (UPC) and/or other unique identifier associated with footwear to be measured. The unique identifier may be associated with measurement data (e.g., fit parameters) for a particular item of footwear. Therefore, a user may not have to manually type in or otherwise select (e.g., via dropdown menus) any information for footwear being measured.

In one embodiment, footwear measuring apparatus 600 includes an interface device 606. Interface device 606 may be a wired interface device (e.g., an Ethernet adapter, a universal serial bus (USB) adapter, a firewire adapter, a Thunderbolt interface adapter, etc.) or a wireless interface device (e.g., a Bluetooth adapter, a WiFi adapter, a Zigbee adapter, a wireless modem and SIM card for communication with a mobile phone network, etc.). Interface device 606 may connect footwear measuring apparatus 600 to a computer via a wired or wireless connection, and may transmit measurement data to the computer. In one embodiment, footwear measuring apparatus 600 automatically populates a database with the measurement data.

Figure 7:
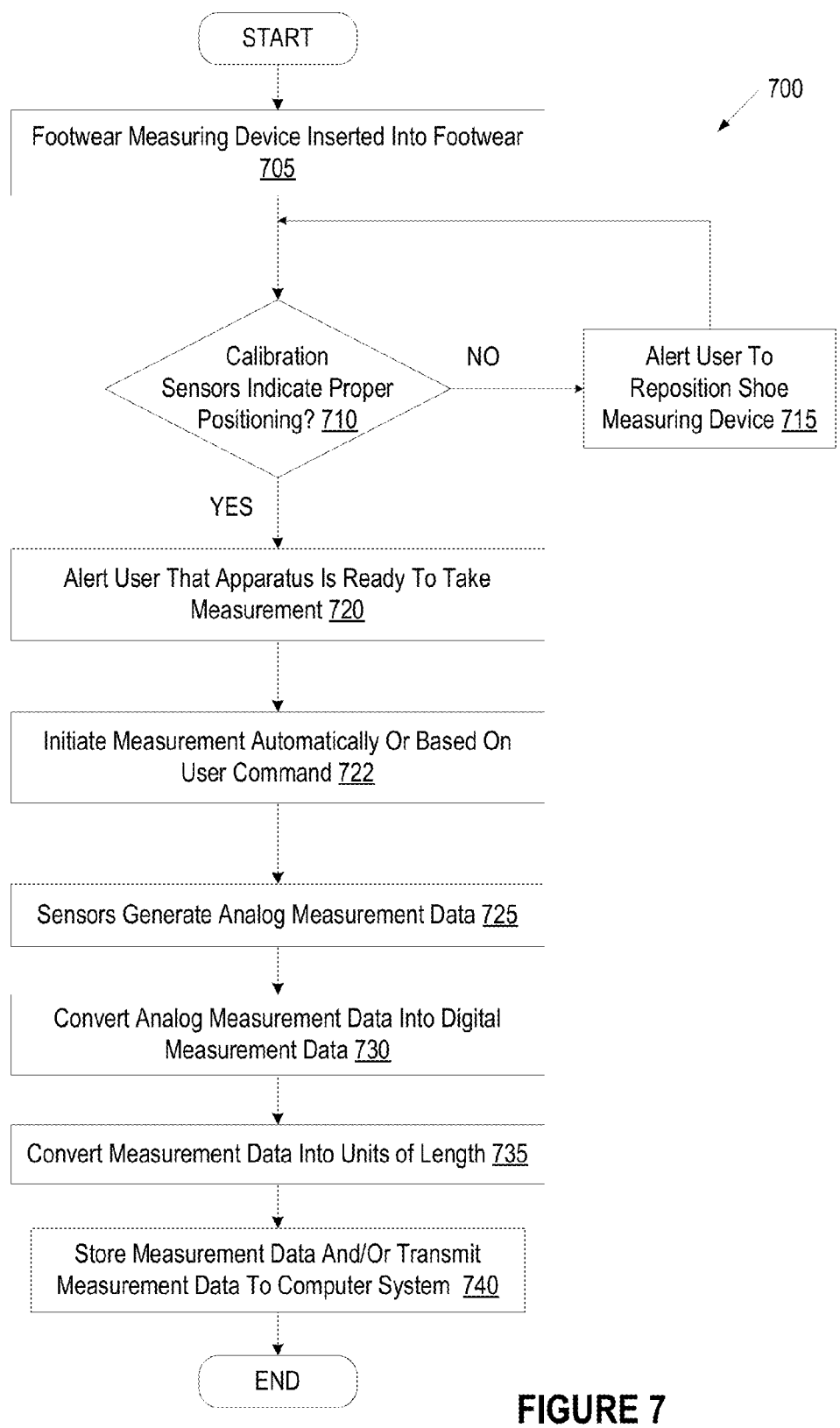
FIG. 7 is a flow chart illustrating a method for determining the internal dimensions of footwear by a footwear measuring apparatus, in accordance with one embodiment of the present invention.

FIG. 7 is a flow chart illustrating a method 700 for determining the internal dimensions of footwear by a footwear measuring apparatus such as footwear measuring apparatus 101 of FIGS. 1-5, in accordance with one embodiment of the present invention. At block 705 of method 700, a user initiates the method 700 by inserting a footwear measuring apparatus into an article of footwear. The user may load the footwear measuring apparatus into the footwear toe first.

At block 710, the footwear measuring apparatus determines whether it has been properly positioned inside of the footwear. The footwear measuring apparatus may be properly positioned when some or all calibration sensors indicate proper placement (e.g., all calibration switches are depressed). If the footwear measuring apparatus is properly positioned, the method continues to block 720. Otherwise, the method proceeds to block 715.

At block 715, the footwear measuring apparatus alerts a user to reposition the footwear measuring apparatus inside of the footwear. The footwear measuring apparatus may provide an indication as to whether the footwear measuring apparatus is properly positioned. For example, the user may be informed to realign the device based on one of more visual indicators (e.g., LEDS) being unlit or showing a particular color. Alternatively, or additionally, the user may be alerted via tactile feedback and/or audio feedback. For example, footwear measuring apparatus may emit a particular sound when the apparatus is improperly positioned, and may emit another sound when the apparatus is properly positioned.

At block 720, the footwear measuring apparatus alerts a user that the apparatus is ready to take a measurement. The user may be alerted based on the audio, visual and/or tactile indicators discussed above. If all of the calibration switches are depressed, for example, then the apparatus may be centered and resting flat on an inner sole of the footwear, and one or multiple LEDs may be lit.

At block 722, the footwear measuring apparatus may receive a command to initiate a measurement of the footwear. The command may be generated based on the user depressing a trigger. In response, footwear measuring apparatus may initiate the measurement. Alternatively, footwear measuring apparatus may automatically initiate the measurement when it is properly positioned inside the footwear.

At block 725, sensors of the footwear measuring apparatus generate analog measurement data. At block 730, the footwear measuring apparatus converts the analog measurement data into digital measurement data using an ADC. At block 735, the footwear measuring apparatus processes the data to convert it into units of length. The footwear measuring apparatus may also further process the data to prepare and/or organize it for transmission to a remote computer and/or for use by the computer. For example, a USB converter may take the information organized by the data processing and format it to be read through a USB port connected to the apparatus.

At block 740, the footwear measuring apparatus stores the measurement data in a local storage and/or transmits the measurement data to a computer system. Each fit parameter and/or other parameter included in the measurement data may be stored in a particular field outlined by a database system running on the computer system.

Figure 8:
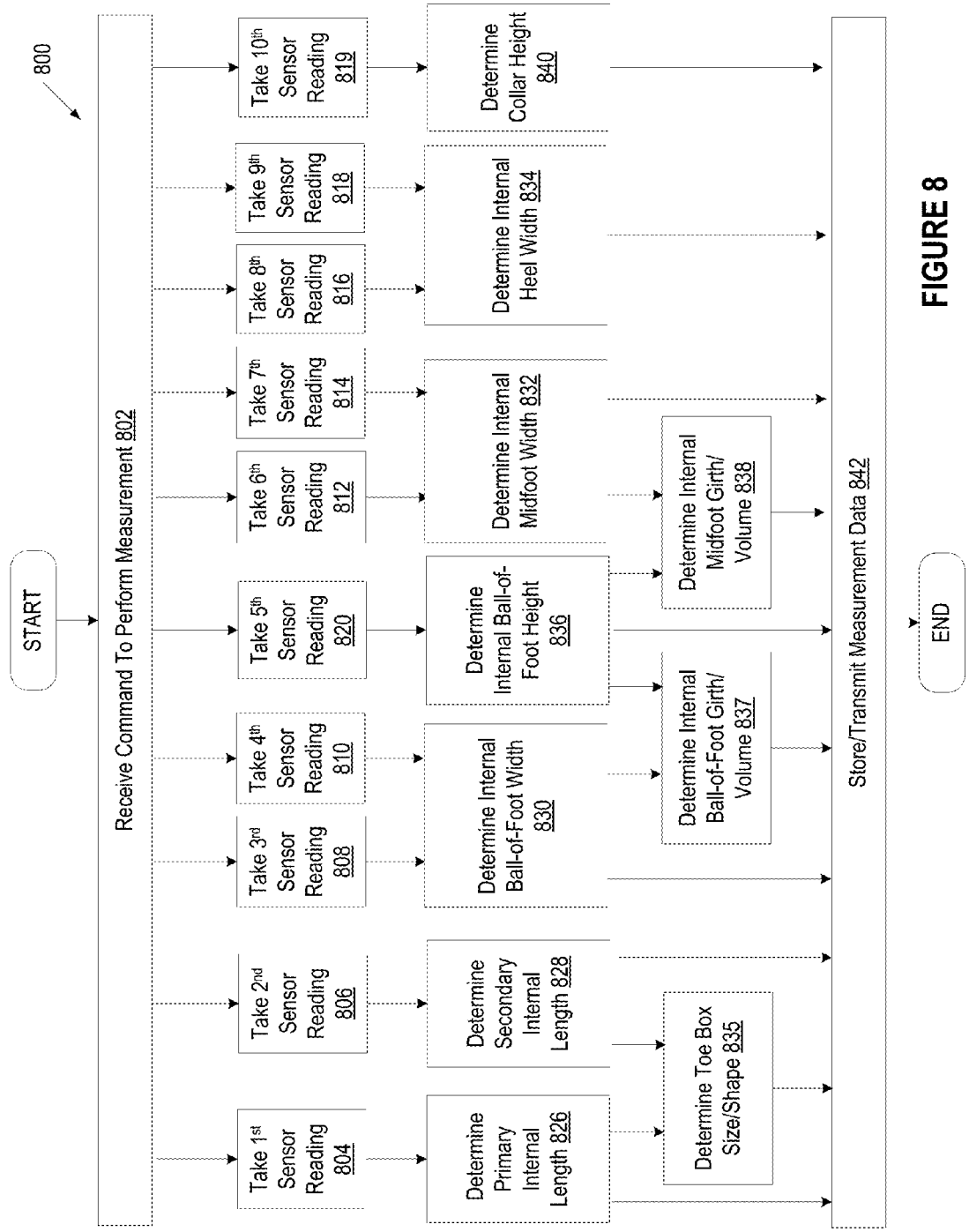
FIG. 8 is a flow chart illustrating a method for measuring fit parameters of footwear by a footwear measuring apparatus, in accordance with another embodiment of the present invention.

FIG. 8 is a flow chart illustrating a method for measuring fit parameters of footwear by a footwear measuring apparatus, in accordance with another embodiment of the present invention. At block 802, the footwear measuring apparatus receives a command to perform a measurement. At block 804, a first sensor of the footwear measuring apparatus takes a first measurement. The first measurement is representative of a primary internal length of footwear into which the footwear measuring apparatus has been inserted, but is not initially in units of length measurement. The primary internal length may correspond to a maximum distance between a heel of the footwear and a front of the footwear at a big toe region. At block 826, a processor determines a primary internal length of footwear based on converting the measurement into a unit of length measurement (e.g., into inches or mm). It does this by being calibrated to the known length of the apparatus, thus it knows the distance from a heel region of the footwear being measured to a toe region.

At block 806, a second sensor measures a length of the footwear at a second location (e.g., where a wearer's pinky toe would be positioned). At block 828, the processor determines a secondary internal length of the footwear based on this measurement (e.g., converts a voltage or resistance measurement into units of length). At block 835, the processor computes a size and/or relative shape of the footwear's toe box based on the primary internal length and the secondary internal length. This may be done by relating first and second internal lengths. For example, a curve may be computed based on a relative placement (e.g., separation) between the first and second sensors and the measurements output by these sensors. This curve may define the shape and/or size of the toe box.

At block 808, a third sensor measures the distance from the center of the apparatus to an inner wall of one side of the footwear at a ball-of-foot region. At block 810, a fourth sensor measures the distance from the center of the apparatus to an inner wall of the opposite side of the footwear at the ball-of-foot region. At block 830, the processor converts these measurements into units of length and then adds the determined length measurements together to determine an internal width of the footwear at a ball-of-foot region.

At block 820, a fifth sensor measures a distance from a top of the apparatus at a ball-of-foot region to an inner wall of a top of the footwear (e.g., the tongue). At block 836, the processor determines an internal ball-of-foot height based on the measurement (e.g., by converting voltage or resistance values into units of length)

At block 837, the processor determines an internal girth and/or an internal volume of the footwear at the ball-of-foot region based on the internal ball-of-foot width and the internal ball-of-foot height. The processor may approximate the girth by computing the circumference of an ellipse using half of the height as a semi-major axis of an ellipse and half the width as a semi-minor axis of the ellipse.

At block 812, a sixth sensor measures a voltage or resistance representative of a distance from the center of the apparatus to in inner wall of one side of the footwear at a midfoot region. At block 814, a seventh sensor measures a voltage or resistance representative of the distance from the center of the apparatus to an inner wall of the opposite side of the footwear at the midfoot region. At block 832, the processor converts the measurements into units of length and adds the measurement of the sixth sensor to the measurement of the seventh sensor to determine an internal width of the footwear at the midfoot region (e.g., at the instep). This may give the actual width distance at the midfoot of the shoe as it relates to the longitudinal arch on the medial side of the of the human foot and the relative location of the proximal head of the $5^{th}$ metatarsal bone located on the lateral side of the human foot. At block 838, the processor determines an internal girth and/or an internal volume of the footwear at the midfoot region based on the internal midfoot width and the internal ball-of-foot height. Alternatively, an additional sensor may be used to determine an internal height of the footwear at the midfoot region, and this measurement may be used along with the midfoot width to compute the girth and/or volume of the footwear at the midfoot region. The additional sensor may identify the depth of the instep of the shoe as it relates to the instep of a human foot.

At block 816, an eighth sensor measures a voltage or resistance representative of a distance from the center of the apparatus to in inner wall of one side of the footwear at a heel region. At block 818, a ninth sensor measures a voltage or resistance representative of the distance from the center of the apparatus to an inner wall of the opposite side of the footwear at the heel region. At block 834, the processor converts these measurements into units of length and adds the measurement of the eighth sensor to the measurement of the ninth sensor to determine an internal width of the footwear at the heel region. This may give the actual width distance at the heel portion of the footwear as it relates to the heel of the human foot.

At block 819, a tenth sensor measures a voltage or resistance representative of the distance from the base of the apparatus to a collar of the footwear. The tenth sensor may be a free floating sensor without an internal pressure spring. The measuring end the tenth sensor may be mounted to a flat metal bar configured to catch on a collar of footwear.

At block 842, the processor stores and/or transmits the measurement data. Each computed measurement may be stored in a separate field of a database or table. The field may be associated with a particular measurement. For example, a primary internal length may be stored in a first field, a secondary internal length may be stored in a second field, a toe box size and/or shape may be stored in a third field, an internal ball-of-foot width may be stored in a fourth field, an internal ball-of-foot height may be stored in a fifth field, an internal volume may be stored in a sixth field, and so on.

The footwear measuring apparatus described herein may be used to scan an entire inventory of footwear (e.g., every model sold by a retailer), and populate a footwear database with the internal fit parameters of the various models. The footwear measuring apparatus could scan just a single size (or a few sizes) of each model. The footwear measuring apparatus or an external computer system could then calculate all of the fit parameters (e.g., internal dimensions) for all sizes not being scanned. This data relating to the other sizes may then also be used to populate the footwear database.

Once all of the fit information is entered, a user interface system could be used to access the fit information. A user could choose to enter one shoe from the database as a reference model. The system would sort and display shoes according to the fit parameters of the reference model requested by the user. The user could further narrow down the selection of shoes displayed by entering additional filter information, i.e. type of shoe, color, material. Any and all information that is related to a shoe can be used to filter the selection of shoes being displayed. Once a shoe is selected, the user can move to purchase the shoe.

Another way to provide a shoe selection process based on a footwear database populated using measurement data from the described footwear measuring apparatus is to enter measurement information about a user's foot dimensions. The user would be given the opportunity to enter all or some portion of their foot measurements into a user interface. The system would use the entered information to reference and sort the shoes and then display them according the shoes most closely matching the measurements. The user could further narrow down the selection of shoes being displayed by entering additional filter information, i.e. type of shoe, color, material.

The footwear measuring apparatus described in embodiments of the present invention may be used to create a better shoe buying experience. Online retailers may use this apparatus to provide a more reliable purchase for the user. It would give them an experience that they could heretofore only get in a brick and mortar store.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A footwear measuring apparatus comprising:
    a body;
    a plurality of probes configured to extend from the body;
    one or more measurement devices, mounted to the body, to measure distances that the plurality of probes extend from the body, wherein the distances indicate fit parameters of a footwear, wherein the footwear's fit parameters that are measured by the one or more measurement devices based on extension of the plurality of probes comprise at least one of an internal footwear length, an internal size and shape of the footwear at a toe box region, an internal width of the footwear at a ball-of-foot region, an internal height of the footwear at the ball-of-foot region, an internal volume of the footwear at the ball-of-foot region, an internal height of the footwear at a middle region, an internal width of the footwear at a heel region or a collar height of the footwear; and
    at least one calibration sensor, mounted to the body, to determine if the footwear measuring apparatus is positioned inside of the footwear.

2. The footwear measuring apparatus of claim 1, wherein the footwear measuring apparatus is sized to fit inside and measure a right foot shoe or a left foot shoe that is within a predetermined range of footwear sizes.

3. The footwear measuring apparatus of claim 1, further comprising:
    a data interface device, electrically coupled to the one or more measurement devices, to convert received signals from the one or more measurement devices into units of length.

4. The footwear measuring apparatus of claim 1, wherein at least some of the plurality of probes extend from the body approximately in unison with approximately equal amounts of force.

5. The footwear measuring apparatus of claim 1, further comprising:
    a handle, included in or connected to the body; and
    a trigger mounted to the handle, wherein the trigger is configured to initiate measurement of the footwear if the at least one calibration sensor indicates that the footwear measuring apparatus is properly positioned inside of the footwear.

6. The footwear measuring apparatus of claim 1, further comprising:
    an indicator, mounted to the body, to identify when the footwear measuring apparatus is properly positioned within the footwear.

7. The footwear measuring apparatus of claim 1, wherein for each probe of the plurality of probes, the footwear measuring apparatus extends the probe linearly into the footwear until the probe contacts an internal wall of the footwear and encounters a threshold level of resistance.

8. The footwear measuring apparatus of claim 1, wherein the plurality of probes comprise:
    a first probe, positioned at a first location on a first side of the body to measure the footwear at a medial ball-of-foot region corresponding to a first metatarsal joint of a wearer; and
    a second probe, positioned at a second location offset from the first location, on a second side of the body that is opposite the first side to measure the footwear at a medial ball-of-foot region corresponding to a fifth metatarsal joint of a wearer;
    wherein the one or more measurement devices determine a width of the footwear at the ball-of-foot location based on distances extended by the first probe and the second probe.

9. The footwear measuring apparatus of claim 1, wherein:
    at least some of the plurality of probes are actuated by at least one of a pneumatic actuator or a servo motor connected to the plurality of probes via cables; and
    the at least one calibration sensor comprises a calibration switch.

10. A footwear measuring apparatus comprising:
    a body;
    a plurality of sensors, mounted to the body, configured to measure fit parameters of a footwear, wherein the plurality of sensors comprises:
        one or more first sensors configured to measure distances between a top of the body and an internal wall of a top of the footwear;
        one or more second sensors configured to measure distances between the body and an internal wall of a front of the footwear; and
        one or more third sensors configured to measure distances between the body and internal walls of sides of the footwear;
        wherein the measured distances indicate the fit parameters of the footwear; and
    at least one calibration sensor, mounted to the body, to determine if the footwear measuring apparatus is positioned inside of the footwear.

11. The footwear measuring apparatus of claim 10, further comprising:
    one or more first probes, mounted to the body, configured to extend from the top of the body towards the internal wall of the top of the footwear;
    one or more second probes, mounted to the body, configured to extend from the body towards the internal wall of the front of the footwear; and
    one or more third probes, mounted to the body, configured to extend from the body towards the internal walls of the sides of the footwear;

wherein the one or more first sensors measure extension of the one or more first probes, the one or more second sensors measure extension of the one or more second probes and the one or more third sensors measure extension of the one or more third probes.

12. The footwear measuring apparatus of claim 10, wherein the plurality of sensors comprise potentiometers.

13. The footwear measuring apparatus of claim 10, wherein the footwear measuring apparatus is sized to fit inside and measure a right foot footwear or a left foot footwear that is within a predetermined range of footwear sizes.

14. The footwear measuring apparatus of claim 10, further comprising:
   a data interface device, electrically coupled to the plurality of sensors, to convert received signals into units of length.

15. The footwear measuring apparatus of claim 10, further comprising:
   a handle, included in or mounted to the body; and
   a trigger mounted to the handle, wherein the trigger is configured to initiate measurement of the footwear if the at least one calibration sensor indicates that the footwear measuring apparatus is properly positioned inside of the footwear.

16. A method of measuring fit parameters of footwear, comprising:
   in response to insertion of a footwear measuring apparatus into the footwear, determining by the footwear measuring apparatus whether one or more calibration sensors of the footwear measuring apparatus are activated;
   in response to determining that at least one of the one or more calibration sensors is not activated, notifying a user to reposition the footwear measuring apparatus in the footwear;
   initiating, by the footwear measuring apparatus, measurements of current, voltage or resistance representative of internal dimensions of the footwear in response to determining that the one or more calibration sensors are activated, wherein the internal dimensions comprise one or more internal height parameters, one or more internal width parameters and one or more internal length parameters;
   converting the measurements into units of length; and
   transferring the converted measurements to a computer system.

17. The method of claim 16, wherein initiating the measurements comprises extending a plurality of probes from a body of the footwear measuring apparatus approximately in unison with approximately equal amounts of force.

\* \* \* \* \*